(12) United States Patent
Esteves Palmeira

(10) Patent No.: US 8,876,134 B2
(45) Date of Patent: Nov. 4, 2014

(54) ARRANGEMENT FOR AXLE AND WHEELS WITH ROLLING CYLINDERS FOR TRANSPORTATION

(76) Inventor: Andre Luiz Esteves Palmeira, Rio de Janeiro (BR)

( * ) Notice: Subject to any disclaimer, the term of this patent is extended or adjusted under 35 U.S.C. 154(b) by 9 days.

(21) Appl. No.: 13/704,365

(22) PCT Filed: Jun. 24, 2011

(86) PCT No.: PCT/BR2011/000189
§ 371 (c)(1),
(2), (4) Date: Jun. 14, 2013

(87) PCT Pub. No.: WO2011/160198
PCT Pub. Date: Dec. 29, 2011

(65) Prior Publication Data
US 2013/0257015 A1    Oct. 3, 2013

(30) Foreign Application Priority Data
Jun. 23, 2010  (BR) .................................. 9001090 U

(51) Int. Cl.
*A63G 25/00*   (2006.01)
*B62C 1/04*    (2006.01)
*B60B 19/00*   (2006.01)
*B60P 9/00*    (2006.01)
*B62D 61/00*   (2006.01)

(52) U.S. Cl.
CPC ... *B60P 9/00* (2013.01); *B62C 1/04* (2013.01); *B60B 19/00* (2013.01); *B62D 61/00* (2013.01)
USPC .............................. 280/208; 280/205; 280/206

(58) Field of Classification Search
CPC ................................. B62K 17/00; A63B 19/02
USPC ........................................... 280/208, 205, 206
See application file for complete search history.

(56) References Cited

U.S. PATENT DOCUMENTS 366,690  A  *  7/1887  Schoening ..................... 280/208
389,855  A  *  9/1888  Rombauer ..................... 280/208

(Continued)

FOREIGN PATENT DOCUMENTS

WO      2005047156 A1    5/2005

OTHER PUBLICATIONS

International Search Report for International Application No. PCT/BR2011/000189 dated as mailed Sep. 8, 2011.

*Primary Examiner* — Joseph M Rocca
*Assistant Examiner* — Marlon Arce
(74) *Attorney, Agent, or Firm* — Cozen O'Connor

(57) ABSTRACT

Arrangement for axle and wheels with rolling cylinders for transportation of a load, formed by two separate wheels (1) positioned parallel to one another by means of a main axle (10) arranged in the center of the wheels and a plurality of rolling cylinders (11) that turn radially about the individual axis thereof, supporting and moving thereon a base board (12); said cylinders are fastened by cable or cord (13) to the reel (14), which optionally takes up the cord (13) by means of the handle (15); the rolling cylinders (11) are arranged in an annular manner on the inner face of the wheels (1), following the circumference of the wheels; the ends of the main axle (10) and the base board (12) are connected by cables or cords or the like to the pulling animal or to any other force capable of moving the assembly; movement of the wheels (1) gives rise to the simultaneous movement of the rolling cylinders (11), which, in operation, pass under the base (12) and support the load contained on the base, allowing the sliding thereof on the rolling shafts (11).

12 Claims, 2 Drawing Sheets

(56) References Cited

U.S. PATENT DOCUMENTS

| | | | |
|---|---|---|---|
| 3,062,560 A * | 11/1962 | Dunstan | 280/208 |
| 3,183,020 A * | 5/1965 | Hawver | 280/208 |
| 3,662,775 A | 5/1972 | Clark et al. | |
| 3,990,650 A | 11/1976 | Devine | |
| 4,192,395 A * | 3/1980 | Barber | 180/6.5 |
| 4,743,849 A * | 5/1988 | Novikov | 324/213 |
| 5,769,441 A * | 6/1998 | Namngani | 280/208 |
| 7,530,521 B2 | 5/2009 | Puck | |
| 2004/0060759 A1* | 4/2004 | Hume | 180/218 |
| 2009/0196723 A1 | 8/2009 | Smith et al. | |

\* cited by examiner

ARRANGEMENT FOR AXLE AND WHEELS WITH ROLLING CYLINDERS FOR TRANSPORTATION

In regard of this Request of Patent Utility Model a "DISPOSAL INSERTED IN AXLE AND WHEELS WITH ROLLING CYLINDERS FOR TRANSPORT" translated as a transporter capable to transport a large amount of weight to be pulled by animal traction or by any other force.

TECHNICAL BACKGROUND

One of the oldest inventions reported in the history of human evolution are the known pull and carry loads carts pulled by equine animals, cattle, canines and others widely used on small farms to pull objects and agricultural implements and to trigger agricultural implements.

This type of carrier cart is typically assembled on a chassis that supports a base of support within its limits surrounded by a grid or walls that limit the internal space of the cart to pack the items to be transported. The chassis presents an axis with bearings installed on wheels where operationally allows movement and supports a given load as the specification of the materials used. It also includes a spring suspension or absence of suspension.

In the traditional animal traction transport carts the entire load is supported by the axle and wheels. This limits the amount being carried and still the service life is reduced due to the sustained efforts.

The present invention has the objective to transporting a large amount of weight due to this being supported by rolling cylinders. By being massive and in a greater number, they support a greater weight than the weight was supported on only one or two axes, as in the case of a cart.

The differential of the invention is that the load weight is distributed over several sliding axes disposed in a carrier.

The wheels just sustain the weight of the rolling cylinders, and not of what will be transported, which has its weights distributed over several massive axes directly supported on the transport surface, conferring it a wide load capacity.

The movement is accomplished by tying up the motive force on the load and at the axis end that joins the two wheels. Another way is tying up a board supported on the rolling axes and the referred ends.

The improvement, reason for this request of a Patent Utility Model, presents a number of advantages when compared with the others existing in the segment.

The attached drawings show the "DISPOSAL INSERTED IN AXLE AND WHEELS WITH ROLLING CYLINDERS FOR TRANSPORT"

In order to obtain a better understanding of the characteristics of the present request of patent utility model, where in a exemplified manner, although not limited to, is represented an embodiment for the system now claimed, where:

Figure 1:
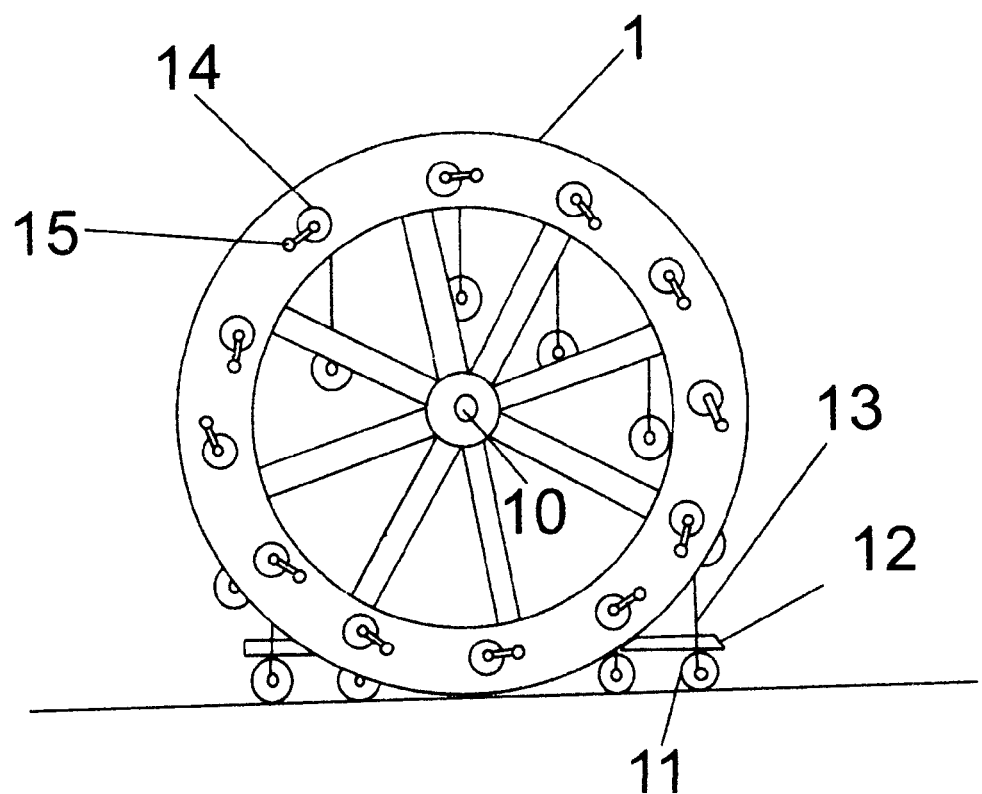
FIG. 1 represents a side view of the "DISPOSAL INSERTED IN AXLE AND WHEELS WITH ROLLING CYLINDERS FOR TRANSPORT"
Figure 2:
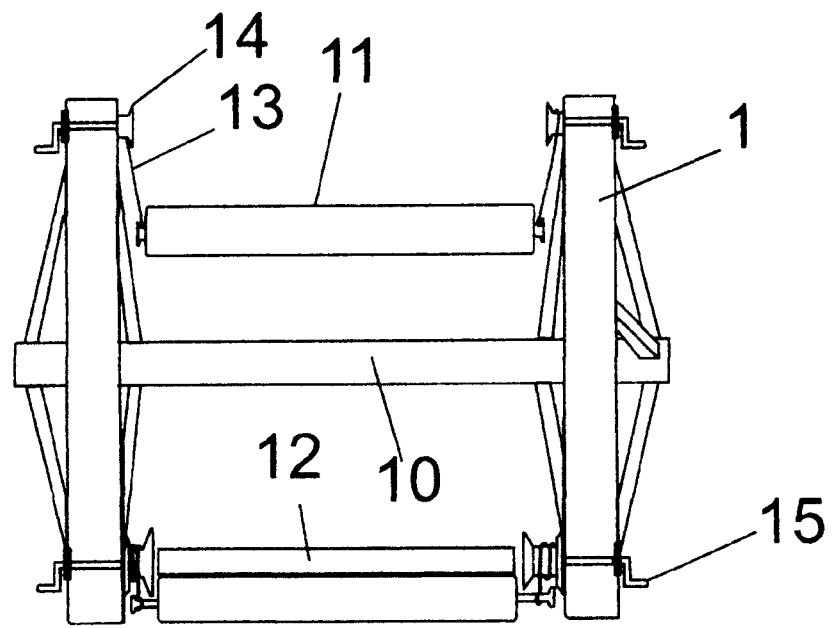
FIG. 2 represents a frontal view of the "DISPOSAL INSERTED IN AXLE AND WHEELS WITH ROLLING CYLINDERS FOR TRANSPORT"
Figure 3:
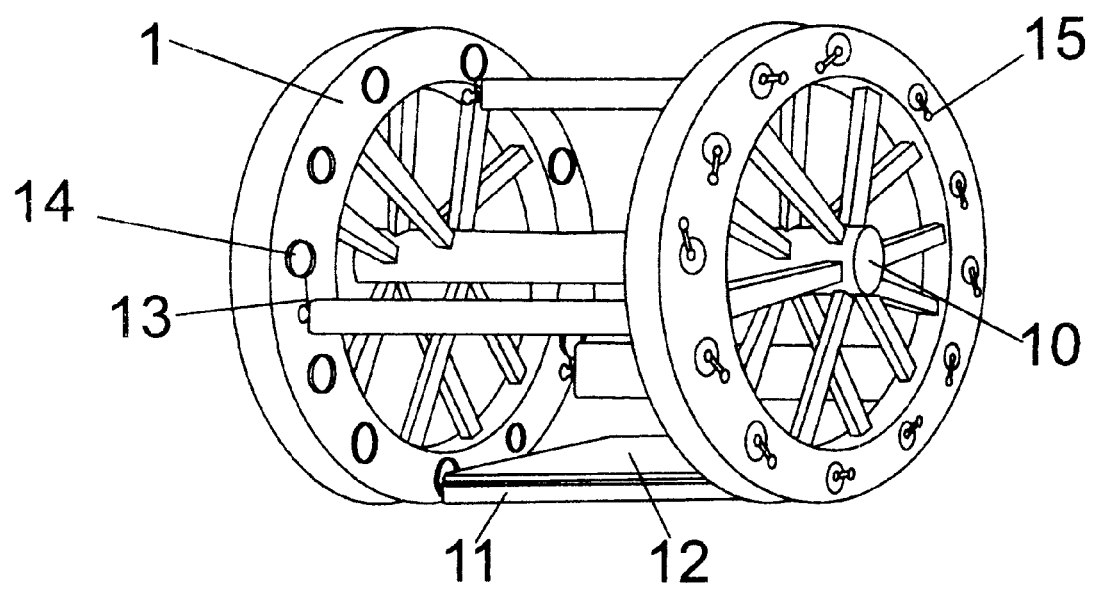
FIG. 3 represents the perspective view of the "DISPOSAL INSERTED IN AXLE AND WHEELS WITH ROLLING CYLINDERS FOR TRANSPORT"

According to these illustrations and their details, the "DISPOSAL INSERTED IN AXLE AND WHEELS WITH ROLLING CYLINDERS FOR TRANSPORT" consists of two wheels (1) separated and positioned parallel to each other by a principal axle (10) disposed in the center of the wheels. A plurality of rolling cylinders (11) that rotate radially around its own axis, sustain and move on themselves a base board (12); the said cylinders are attached by cable or rope (13) to the reel (14) that collects the rope (13) throught the crank (15). When the rolling cylinder (11) reaches the ground and gets close to the reel (14), so that the rope (13) does not create knots or tangle, the crank is activated collecting the rope or cable (13). The system can still be present without the said cranks (15) and reels (14), not collecting the rope or cable (13) that supports the rolling cylinder (11).

The rolling cylinders (11) are disposed in an annular way at the internal face of the wheels (1) accompanying its circumference.

The extremities of the main axis (10) and the base board (12) or the load to be transported are joined by cables or ropes or others to the traction animal or at any other force capable to move the set.

The movement of the wheels (1) results in the simultaneous movement of the rolling cylinders (11) that operationally pass beneath the base (12) and sustain the load at the contained base. The cycle of this sequence is that the load remains on a number of rolling cylinders (11) supported on the ground performing the transport properly said.

The invention claimed is:

1. A transporter comprising two wheels positioned parallel to each other by a principal axle disposed in the center of said wheels and further comprising a plurality of rolling cylinders that rotate radially around their own axis and a base board; wherein said rolling cylinders are attached by cable or rope to an internal face of said wheel; said rolling cylinders being disposed in an annular way at said internal face of said wheels; wherein a movement of said wheels results in a simultaneous movement of said rolling cylinders sustaining a load by allowing a load and said base board to slide on said rolling cylinders when submitted by any other force capable of moving the transporter.

2. Said transporter of claim 1 further comprising a reel, wherein said reel collects said rope attached to said rolling cylinders.

3. The transporter of claim 2 further comprising a crank for collecting said rope.

4. The transporter of claim 1 wherein an article capable of exerting an external force capable of moving said transporter is secured to each end of a principal axel.

5. The transporter of claim 1 wherein an article capable of exerting an external force capable of moving said transporter is secured to said base board.

6. The transporter of claim 1 wherein an article capable of exerting an external force capable of moving said transporter is secured to a principal axle and to said base board.

7. The article capable of exerting an external force of any one of claims 4, 5, or 6 being applied by an animal or a machine.

8. A transporter comprising two wheels positioned parallel to each other by a principal axle disposed in the center of said wheels and further comprising a plurality of rolling cylinders that rotate radially around their own axis and a base board; wherein said rolling cylinders are attached by cable or rope to a reel disposed on an internal face of said wheel; and further comprising a crank; wherein said rope is collected through said crank onto said reel; and wherein said rolling cylinders being disposed in an annular way at said internal face of said wheels; wherein a movement of said wheels results in a simultaneous movement of said rolling cylinders sustaining a load by allowing a load and said base board to slide on said rolling cylinders when submitted by any other force capable of moving the transporter.

9. The transporter of claim 8 wherein an article capable of exerting an external force capable of moving said transporter is secured to each end of a principal axle.

10. The transporter of claim 8 wherein an article capable of exerting an external force capable of moving said transporter is secured to said base board.

11. The transporter of claim 8 wherein an article capable of exerting an external force capable of moving said transporter is secured to a principal axle and to said base board.

12. The article capable of exerting an external force of any one of claims 9, 10, or 11 being applied by an animal or a machine.

* * * * *